Aug. 17, 1937.   J. A. PAASCHE   2,090,334
SPRAYING DEVICE
Filed Jan. 20, 1934
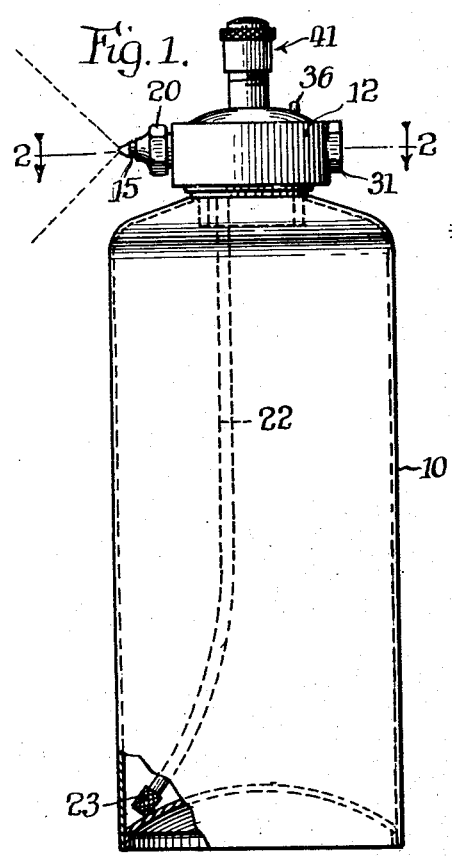
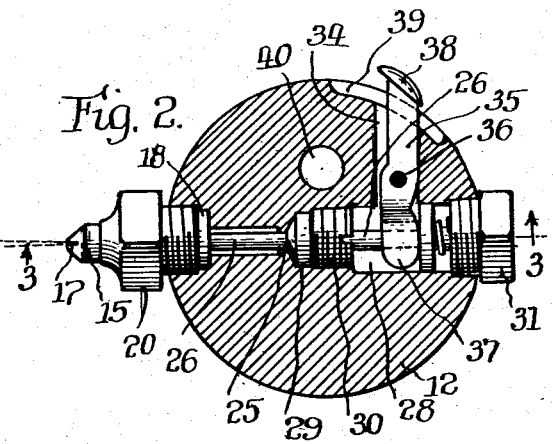
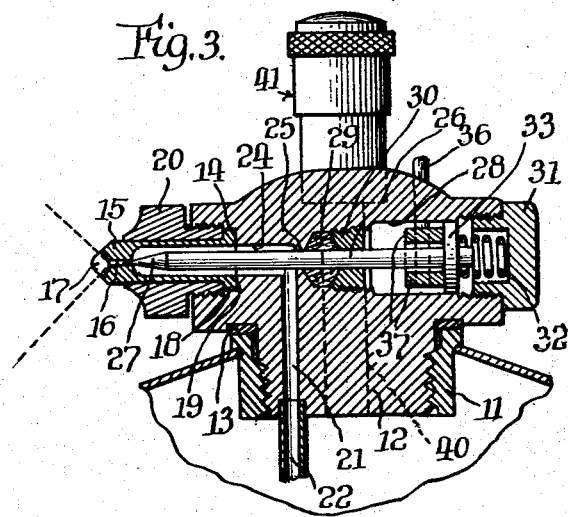
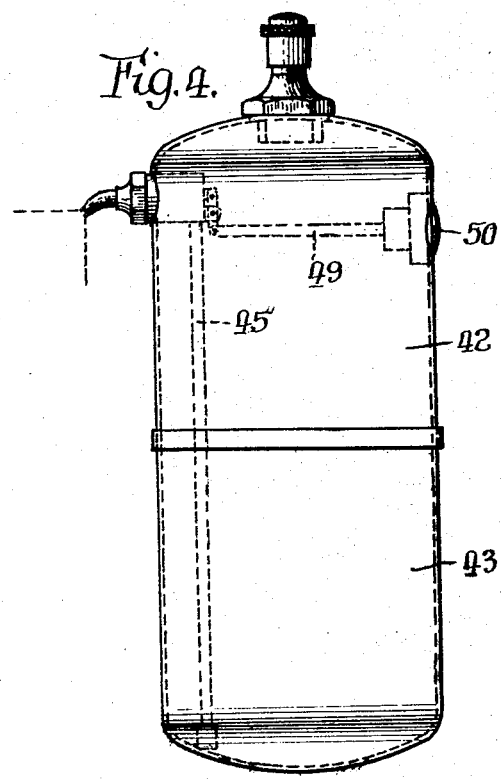
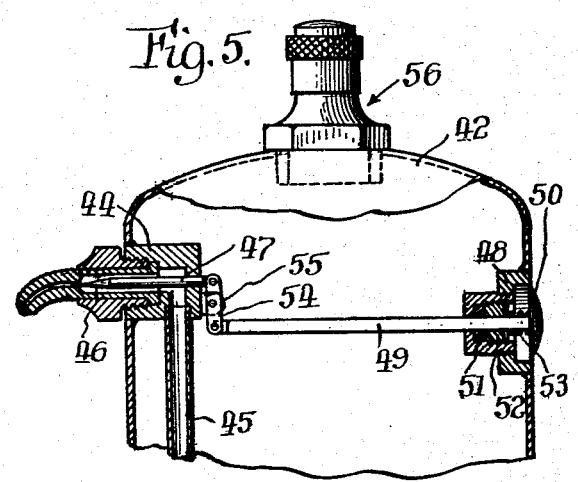
Inventor:
Jens A. Paasche,
By Christoph, Parker & Carlson
Attys.

Patented Aug. 17, 1937

2,090,334

UNITED STATES PATENT OFFICE 2,090,334

SPRAYING DEVICE

Jens A. Paasche, Wilmette, Ill.

Application January 20, 1934, Serial No. 707,461

9 Claims. (Cl. 299—95)

The invention relates to spraying devices of the type in which material is discharged in spray form from a supply container by the force of pressure fluid.

A general aim of the invention is to provide a neat, compact, self contained device of this character which may be easily carried in the operator's hand, is efficient in operation, simple in construction, is particularly adapted for relatively small spraying operations, such, for example, as the application of a cleaning or polishing solution to a surface, and which may be manufactured and sold at a comparatively low cost.

An object of the invention is to provide a new and improved spraying device in which a sealed container is adapted to hold both a supply of material to be discharged and a fluid under pressure, and has a valve controlled discharge nozzle in communication with the material so that the material may be forced through the nozzle, when open, by the force of the pressure fluid.

More particularly stated, another object is to provide a spraying device which embodies a sealed container of comparatively small capacity fashioned to be held conveniently in a user's hand and provided with filling openings for a liquid material and a fluid under pressure, said container having a spray nozzle thereon communicating with the portion of said container which the material occupies, and manipulable means for controlling the flow of material from the container through said nozzle.

Other objects and advantages will become apparent in the following description and from the accompanying drawing, in which:

Figure 1 is a side elevation of a spraying device embodying the features of the invention.

Fig. 2 is a transverse section through the head of the device taken as indicated by the line 2—2 of Fig. 1.

Fig. 3 is a fragmentary sectional view through the head taken along the line 3—3 of Fig. 2.

Fig. 4 is a side elevation of a modified form of spraying device.

Fig. 5 is a fragmentary axial sectional view somewhat similar to that shown in Fig. 3 but of the modified form shown in Fig. 4.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the drawing, wherein the structure of a device embodying the features of the invention is shown merely for illustrative purposes, 10 (Fig. 1) designates a sealed or fluid-tight container which is preferably of relatively small capacity and herein is of cylindrical form. The container is fashioned and dimensioned to be conveniently held in the operator's hand during use. One end wall of the container is centrally apertured, which aperture, as shown in Fig. 3, is defined by an internally screw threaded flange 11. Engageable with the screw threads on the flange are external screw threads formed on a cylindrical extension of a head 12. Preferably the head carries a gasket 13 of sealing material for perfecting a fluid-tight seal between the head and the container.

At one side the head has a circularly and, in this instance, laterally directed recess 14 to receive a discharge element or nozzle member 15. Preferably the nozzle is in the form of a tubular member which is closed at its outer end except for a small diametered discharge bore 16 which may, if desired, terminate in a narrow slot or kerf 17 whereby to produce a fan-shaped spray or discharge. The inner end of the nozzle member has an external annular flange 18 thereon arranged for abutment against the bottom 19 of the recess 14. The nozzle is held in any position of rotative adjustment by a nut or gland 20 which surrounds the nozzle, has screw threaded engagement with the side walls of the recess, and abuts against the flange 18 to bind the flange against the base of the recess. By merely loosening the nut 20, the nozzle may be rotated relative to the head so that the fan-shaped spray can be projected from the container at different angles.

The head 12 has a passageway 21 therein which extends from the end face of the cylindrical extension to a port formed axially of the base of the recess 14 for internal communication with the tubular nozzle. A conduit 22 is secured to the head in communication with the passageway 21 and the conduit extends therefrom to the bottom of the container 10 where the end of the conduit is enclosed by a suitable straining device 23. Preferably the lower end of the conduit is disposed adjacent to the side wall of the container below the nozzle so that all of the material may be discharged from the container.

As may be seen in Fig. 3, the passageway 21 is preferably L-shaped, and the leg 24 thereof which communicates with the nozzle is substantially enlarged. The head has a bore 25 of restricted diameter formed as an axial continuation of the enlarged leg 24 to receive the shank 26 of a needle valve member 27 which normally is seated in the inner end of the bore 16 in control of the discharge through the nozzle. The valve shank 26 extends into an enlarged recess 28 formed in the side of the head opposite the nozzle receiving recess 14. Such means as packing material 29, held in the bottom of the recess 28 about the valve shank 26 by a nut 30, prevents leakage of fluid and material from the passageway 21, and this arrangement serves with the bore 25 to provide a bearing for the valve shank. The outer end of the recess 28 is closed by a plug 31 internally recessed to provide a seat for a spring 32 which bears against a collar 33 fixed on the valve shank 26 near the end thereof. The collar is dimensioned to fit slidably yet snugly within the recess 28 to provide additional support for the valve shank. The spring 32 normally exerts a tension for holding the valve 27 seated in closing relation to the bore 16.

Manipulable means arranged for convenient actuation by the user is provided for unseating the valve against the tension of the spring 32 to initiate a spraying operation. Thus, as shown in Figs. 2 and 3, the head 12 has a lateral slot 34 which communicates with the recess 28. Extending through the slot is an operator 35 which is pivotally mounted on a pin 36 carried by the head and has a forked inner end 37 arranged to straddle the valve shank 26 and to abut against the collar 33 on the side thereof opposite the spring. The outer end of the operator carries a finger piece 38 and beneath this finger piece the head may be cut away, as at 39, to permit the finger piece to occupy a position closely adjacent to the head without interfering with its operation. Through this arrangement perfect control over operation of the needle valve is secured without having protruding parts that might be damaged in use or that might be moved by accidental pressure exerted thereagainst and result in wasteful discharge of material. Moreover, the forked end of the operator engages the collar 33 without direct connection so that the valve is free floating and automatically self-centering, thus compensating for wear and preserving the useful life of the valve.

The head has a passageway 40 therethrough, the outer end of which is closed by a sleeve and cap housing 41 for a check valve mechanism (not shown). The structure of these parts may be and preferably is substantially the same as that conventionally employed in a tire valve and valve stem assembly.

In the operation of the mechanism, the container is first partially filled with material to be discharged through the opening provided by unscrewing the head 12 from the container. After the material has been placed in the container and the head reassembled the container is charged through the valved passageway 40 with a suitable fluid under pressure, usually compressed air. A manually operated pump, the compressed air supply system of a filling station, or any other suitable source of compressed air may be used. Subsequent manipulation of the operator 35 by the user opens the valve in the nozzle and allows the force of the pressure fluid to discharge the material from the nozzle in a finely vaporized spray.

In the modified form of device the container as shown in Fig. 4 is made up of two similar sections 42 and 43, each having one closed end. The sections are fashioned into a sealed container by securing the open ends of the sections together in any suitable manner. The sectional casing permits assembly of the operating mechanism, to be described, within the container so that it is substantially concealed and the appearance of the device enhanced.

Referring to Fig. 5, one side wall of one section, in this instance the section 42, is apertured and a supporting member in the form of a stud 44 is secured to the wall of the section within the container and over the aperture. The stud 44 is recessed in substantially the same manner as has been described in connection with the head 12 to receive a discharge nozzle which is secured to the stud in the manner previously disclosed. A modified form of nozzle is shown on this structure in that the nozzle is turned externally of the recess to produce an angularly directed spray. This form and that shown in Fig. 3 are interchangeable. The stud carries a conduit 45 arranged to extend to the closed end of the opposite section 43 for the purpose of conveying material to the nozzle. Flow of material from the nozzle is controlled by a valve 46 having a shank 47 which is reciprocably supported by the stud.

Internally secured over an aperture in the opposite wall of the section is a plug 48 which reciprocably supports an actuating plunger 49 having a finger piece 50 at its outer end normally disposed substantially in the plane of the section wall. Such means as packing material 51 held in place by a nut 52 prevents leakage along the plunger, and a spring 53 exerts its force between the nut 52 and the finger piece 50 to urge the plunger outwardly. The inner end of the plunger is pivotally connected to a link 54 which is pivotally supported on an outstanding boss 55 on the stud 44. The other end of the link 54 is pivotally connected to the end of the valve shank 47. In this construction inward movement of the plunger 49 retracts the valve 46 and allows material to be discharged through the nozzle.

The closed end of the container section carries a stem and cap arrangement 56 which houses a tire valve assembly, but in this instance the entire structure has a screw threaded engagement with the container section whereby it may be removed bodily therefrom to provide an opening through which the container may be charged with material. Otherwise the operation of the modified form of device shown in Figs. 4 and 5 is substantially the same as that of the first described mechanism.

It will be evident from the foregoing that a novel spraying device has been provided which is neat and compact and is especially well adapted for use in connection with comparatively small spraying operations. For example, many uses for a device of this character can be found in industries wherein such a small amount of material is required at any one time that it would not be advisable to employ a larger, more cumbersome and expensive spraying mechanism. The construction of the present device is simple yet it is sturdy, the operative parts thereof may be quickly assembled, and the device may be manufactured and sold at a relatively low cost.

I claim as my invention:

1. In a spraying device, the combination of a container fashioned to be conveniently supported in a user's hand and having means thereon through which the container is charged with material to be discharged and with a fluid under pressure, a spray nozzle mounted near the upper end of said container to direct its discharge laterally of the container axis and having a discharge bore therethrough, means for establishing communication between said bore and the bottom of said container, a needle valve seated in the inner end of said bore for controlling discharge through said nozzle, and means for manipulating said valve including a finger piece located on the side of said container substantially opposite to said nozzle, and operable by inward pressure by the finger of the user.

2. A material discharging device comprising, in combination, a container having a supporting stud secured to a lateral wall near an end thereof, means through which the container may be charged with material to be discharged and with air under pressure, a discharge nozzle on said supporting stud, means for conveying material under the force of the air pressure to said nozzle, a nozzle controlling needle valve in said supporting stud, and means for manipulating said valve including compression means for maintaining said valve normally closed and a member movable inwardly relative to the plane of said container for withdrawing said valve from closed position.

3. In a spraying device, the combination in an assembly adapted to be held by one hand of the operator while in use and including an elongated container adapted to contain material to be sprayed under substantial pressure and means for intermittently releasing a spray of said material at the will of the operator, of a discharge nozzle adjacent one end of the container and extending from one side of the assembly substantially perpendicularly to the axis of the container, said nozzle including an axial discharge bore communicating with the portion of the container which is occupied by material, a needle valve within the assembly coaxial with and seated in the inner end of said bore for controlling the discharge of material therethrough, said needle valve being of substantial length but passing only partially through the assembly, means for normally exerting resilient pressure upon said valve to retain the same in closed position to prevent the discharge of material through the nozzle, a movable member cooperating with said means and extending outwardly from another side of the assembly spaced from said nozzle, said movable member having an engageable part free of projections and mounted to lie close to the adjacent part of the assembly so as to avoid accidental operating pressure against the engageable part, and a recess in said adjacent part of the assembly to facilitate movement of said engageable part, said member being adapted to be actuated only by positive pressure on said engageable part by a finger of the hand in which the assembly is held for overcoming the pressure of said means and moving said valve from closed position to allow material to be discharged from said nozzle.

4. In a spraying device, the combination of a container arranged to be charged with material to be sprayed and with a fluid under pressure, a spray nozzle on the container having a bore communicating with the portion of the container which is occupied by material and projecting laterally with respect to one side of the container, a supporting member carrying said nozzle, an automatically self-seating needle valve shorter than the diameter of said container and carried within said supporting member and projecting into the inner end of said bore for controlling the force and amount of material passing through the nozzle, resilient means for normally urging said valve into closing position within said bore, and means for withdrawing said valve including a finger piece mounted for movement generally toward the axis of the container having a part projecting into said supporting member and engaging the rear part of said valve for overcoming said resilient means and moving said valve out of said bore when pressure is exerted upon said finger piece.

5. In combination, a sealed container dimensioned to be conveniently held bodily in an operator's hand during use and having means providing access thereinto for filling the container with a material to be discharged and with a fluid under pressure, an adjustable discharge nozzle communicating with the portion of the container which is occupied by the material and having its discharge end extending laterally outwardly and arranged to discharge in a given direction depending on the position of adjustment, finger actuated means manipulable by a finger of the hand in which the container is held for controlling a discharge of material through said nozzle by the force of the fluid pressure, and means surrounding the nozzle and spaced inwardly from its discharge end for maintaining the nozzle fixedly in any adjusted position, said means being releasable to adjust the nozzle to vary the direction of discharge therefrom without shifting the position of the container in the operator's hand.

6. In combination a spraying device including a sealed container for pressure fluid, a spraying head secured to the upper end of said container and having an angular passage therein one leg of which opens outwardly from one side of the head and the other leg of which opens toward the interior of the container, fluid delivery means extending toward the lower end of the container and communicating with said inwardly opening leg of said passage, the mouth of said outwardly opening leg being substantially enlarged to provide an internally threaded outwardly opening recess, an elongated tubular discharge member having a spraying opening at one end for directing spray in a predetermined direction laterally of the container and having a laterally projecting flange at its other end adapted to fit slidably against the base of said recess, a valve stem extending through the outwardly opening leg of said passage and carrying a valve for controlling discharge through said nozzle, means on said head for moving said valve stem to control said valve, and means in threaded engagement in said recess and in abutting relation to said flange to bind said flange against the base of the recess, said last mentioned means being releasable to permit relative rotation of the nozzle member to adjust the latter with relation to the direction of spray therefrom.

7. In a spraying device, the combination of a container having means thereon through which the container may be charged with material to be discharged and with a fluid under pressure, a supporting member secured to the upper part of said container and having an outwardly opening internally threaded recess therein, an angular passage communicating at one end with the interior of the container and opening at its opposite end into said recess, a nozzle assembly projecting in part beyond said recess and communicating with said passage, said nozzle assembly including a rotatable part having external threads engaging the internal threads of said recess and being adapted to maintain an adjusted condition of the nozzle assembly, and manually actuable valve means for controlling the passage of material to be discharged through said nozzle.

8. In combination in a spraying device, a spraying head adapted for threaded sealing engagement with a pressure fluid container, a fluid passage in said head communicating with the interior of the container, said passage opening laterally outwardly toward one side of said head and providing an enlarged threaded recess at its outer end, an elongated spraying nozzle in position within said recess to receive pressure fluid from said passage to spray the fluid laterally relative to the container, an annular member in threaded engagement in said recess and coacting with said nozzle for maintaining any predetermined adjusted spraying condition, a needle valve shorter than the diameter of said head and carried therein for controlling the passage of pressure fluid through said nozzle, and a finger engageable lever fulcrumed on said head for operating said valve.

9. A spraying device of the character described embodying an assembly comprising, in combination, a relatively small container for pressure fluid and material to be sprayed adapted to be supported conveniently in one of the operator's hands and having a spray nozzle communicating with the interior of the container, said nozzle being directed generally laterally of the container for projecting a spray stream toward a surface to be treated and having a normally closed valve for controlling the passage of material therethrough, a stem on said valve shorter than the diameter of the container and enclosed within the assembly, and a finger piece mounted to be pressed by a finger of the hand in which the device is held for movement in a direction generally inwardly toward the axis of the assembly and having a part coacting therewith and with the inner end of said valve stem operative in the finger responsive movement of the finger piece to draw said stem inwardly in opposition to the force applied to the finger-piece for moving said valve to open position.

JENS A. PAASCHE.